(12) United States Patent
Kader

(10) Patent No.: US 8,774,784 B2
(45) Date of Patent: Jul. 8, 2014

(54) METHOD AND SYSTEM FOR RAPID CALLER IDENTIFICATION

(71) Applicant: Steven Earl Kader, Côte-Saint-Luc, CA (US)

(72) Inventor: Steven Earl Kader, Côte-Saint-Luc, CA (US)

(*) Notice: Subject to any disclaimer, the term of this patent is extended or adjusted under 35 U.S.C. 154(b) by 0 days.

(21) Appl. No.: 13/905,101

(22) Filed: May 29, 2013

(65) Prior Publication Data

US 2013/0295898 A1   Nov. 7, 2013

Related U.S. Application Data

(63) Continuation-in-part of application No. 13/465,589, filed on May 7, 2012, now Pat. No. 8,463,252.

(51) Int. Cl.
*H04M 3/42* (2006.01)
*H04M 1/00* (2006.01)
*H04M 19/04* (2006.01)
*H04M 1/57* (2006.01)
*H04M 1/725* (2006.01)
*H04W 4/16* (2009.01)

(52) U.S. Cl.
CPC .............. *H04W 4/16* (2013.01); *H04M 19/048* (2013.01); *H04M 1/57* (2013.01); *H04M 1/72525* (2013.01); *H04M 1/72552* (2013.01)
USPC .......................................... 455/415; 455/567

(58) Field of Classification Search
USPC .................................................. 455/415, 567
See application file for complete search history.

(56) References Cited

U.S. PATENT DOCUMENTS 7,151,953 B2 * 12/2006 Hamada et al. ............... 455/567
2008/0125183 A1 * 5/2008 Burgan et al. ................. 455/567

* cited by examiner

*Primary Examiner* — Joel Ajayi
(74) *Attorney, Agent, or Firm* — Stephen E. Zweig

(57) ABSTRACT

A method of using color displays to visually identify another communicating individual to a Smartphone user. The method may be implemented as downloadable App software and run on the Smartphone's microprocessor. Here, various communications means, such as the communicating individual's telephone numbers, email addresses, SMS addresses, or social network identities are assigned to that individual's contact group, and this in turn is linked to a color or combination of colors. When the communicating individual contacts the Smartphone or makes an appropriate social network posting, the App software and processor detect this event, generates the appropriate color display, which can then be seen by the Smartphone user.

12 Claims, 4 Drawing Sheets

Internal Smartphone components

Front face of Smartphone

US 8,774,784 B2

METHOD AND SYSTEM FOR RAPID CALLER IDENTIFICATION

CROSS REFERENCE TO RELATED APPLICATIONS

This application is a continuation in part of U.S. patent application Ser. No. 13/465,589, "METHOD AND SYSTEM FOR RAPID CALLER IDENTIFICATION", inventor Steven Earl Kader, filed May 7, 2012; the contents of which are incorporated herein by reference.

BACKGROUND OF THE INVENTION

1. Field of the Invention

This invention is in the field of caller identification methods for telecommunications devices, with a particular emphasis on mobile phones (e.g. cell phones) and Smart phones.

2. Description of the Related Art

Caller identification (Caller ID) methods of establishing the identity of incoming callers to land line telephones and mobile telephones are well established in the art. Such methods generally show the caller's phone number, and often additional information as well such as the caller's name or business.

Prior art in various forms for Caller ID for cell phones include Yomoda, US patent publication 2005/0020318 who taught a "Handheld terminal device and display control method therefor". Other prior art includes Lim, US patent application 2006/029559, "Telephone device with ornamental lighting", and Burgan et. al., US patent application 2008/0125183, who taught a "METHOD AND APPARATUS FOR LIGHTED PUSH-TO-CONNECT".

Despite such prior art, often mobile phone and Smartphone users are present in situations, such as driving or in meetings, where it is socially awkward or even dangerous to spend much time reading text on a cell phone display screen. Thus further improvements in Caller ID methods would be useful.

BRIEF SUMMARY OF THE INVENTION

The invention is based, in part, on the insight that in many situations, what mobile phone and smart phone users need is a discrete method of, at a glance, and without undue distraction, instantly ascertaining the identity of an important caller, email message sender, SMS message sender, or even social network poster. To avoid undue distraction, the Caller ID output method should be visual, but preferably not so conspicuous as flashing an entire display screen, for example.

The invention is also based in part, on the insight that at least certain modern smart phones, exemplified by the popular BlackBerry™ series of smart phones, are equipped with variable color light emitting diodes that are under the control of the smart phone's processor (microprocessor).

Thus in one embodiment, the invention may be a method of visually signaling the identity of an incoming caller contacting a Smartphone, such as a variable color light emitting diode (LED) equipped smart phone, operated by a user. This method may be performed by determining at least one of the incoming caller's individuals telephone numbers, email addresses, or SMS addresses, and assigning these telephone numbers, email addresses, or SMS addresses (or other messages, such as social network postings) into a contact group associated with the incoming caller. The user may also use the Smartphone's graphical user interface to assign at least one LED color to the contact group associated with this incoming caller, thus producing a contact group LED color assignment, and saving this LED color assignment in memory. The method may then involve programming the Smartphone (often using a downloaded software App for this purpose). Here this software can set the Smartphone so that for each incoming telephone call, email, SMS message or social network posting from the contact group associated with that particular incoming caller, the software will flash the cell phone's LED or color display according to the color assignment of that individuals contact group.

Thus although in a preferred embodiment, the method may use the Smartphone's or cell phone's colored LED for Caller ID purposes, other embodiments are also possible. In an alternative embodiment, other visual output methods, such as a colored bar or other icon on the smart phone's display screen may also be used for Caller ID purposes.

DETAILED DESCRIPTION OF THE INVENTION

In this discussion, the operator of the Smartphone will be designated as the Smartphone "user".

Figure 1:
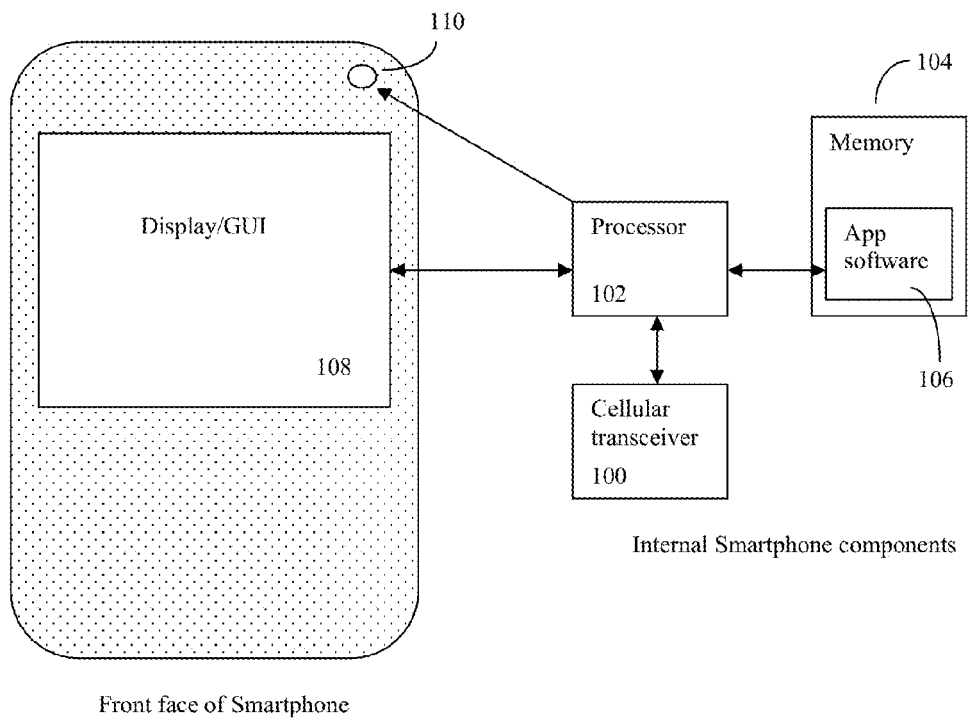
FIG. 1 shows a diagram showing a simplified version of the major components of a Smartphone.

As previously discussed, in some embodiments, the invention may be a software implemented method of visually signaling the identity of an individual contacting a Smartphone (e.g. an incoming caller). As shown in FIG. 1, this Smartphone will generally comprise a cellular phone transceiver (100), processor (102), memory (104), software (106), and a graphical user interface (such as a touch sensitive display screen, often capable of displaying color) (108).

The Smartphone will also have at least one colored light emitting device capable of emitting light in a first plurality of software controlled colors. In some embodiments, this colored light emitting device may be the phone's display screen itself (108), while in other embodiments, the colored light emitting device may also comprise one or more light emitting diodes (LEDs) or equivalent devices (110) that are separate and distinct from the phone's display screen (108).

The invention's methods may often be implemented by software, such as for example a downloadable "App" (106). Indeed, an example of such an App, entitled "Who Is It—LED Color Light Alerts for Contacts" was previously developed and published by applicant through the Blackberry App World™ store initially on Nov. 8, 2011, and in a later release on Dec. 22, 2011. This App has since been well received, and has in fact enjoyed a significant amount of commercial success. It is available as a paid App, and as of May 1, 2012, the application has received 12,558 reviews, generally at a very high degree of customer satisfaction ranking (e.g. greater than 4.5 out of 5 stars).

The basic philosophy of this App, as published on November 2011 on the Blackberry App World store, is, with a small amount of reformatting and editing, as follows:

Finally, a BlackBerry® app that lets YOU decide whether to take the call, email, or SMS now or later with 'Who Is It'.

Using your BlackBerry's® front LED, assign up to 10 colors to different callers. Parents? Green. Boss? Yellow. Tax accountant? Blue, blue, blue.

You know who's on the line at a glance so you decide if this is a contact that needs attention now, or a call, email or SMS that can wait a while.

For the free App, you may choose up to 10 different contacts and assign 10 different LED colors so you know who's on the line all of the time. You can easily stop blinking at any time with menu item in every menu. No Smartphone reconfiguration is required. Just download and set up 'Who Is It' with a few taps. It's designed to be easy, like all JaredCo apps. The user-friendly interface allows you to quickly set the LED color to your preferences and needs. Tap, tap, tap. Done.

You can change colors or contacts in just seconds. When you're plugged in to the digital grid, you know how important it is to manage your connections and your time. 'Who Is It' is the one app that does it all with nothing more than your BlackBerry's® LED. Sweet. Add a little color to your life and to your BlackBerry®. And finally get organized with 'Who Is It—the energy-efficient, "at-a-glance" caller ID that puts connections under your control.

Typical customer feedback on the "Who Is It?" App praises the App's ability to function discretely in meeting situations when the phone is otherwise set to silent.

Figure 2:
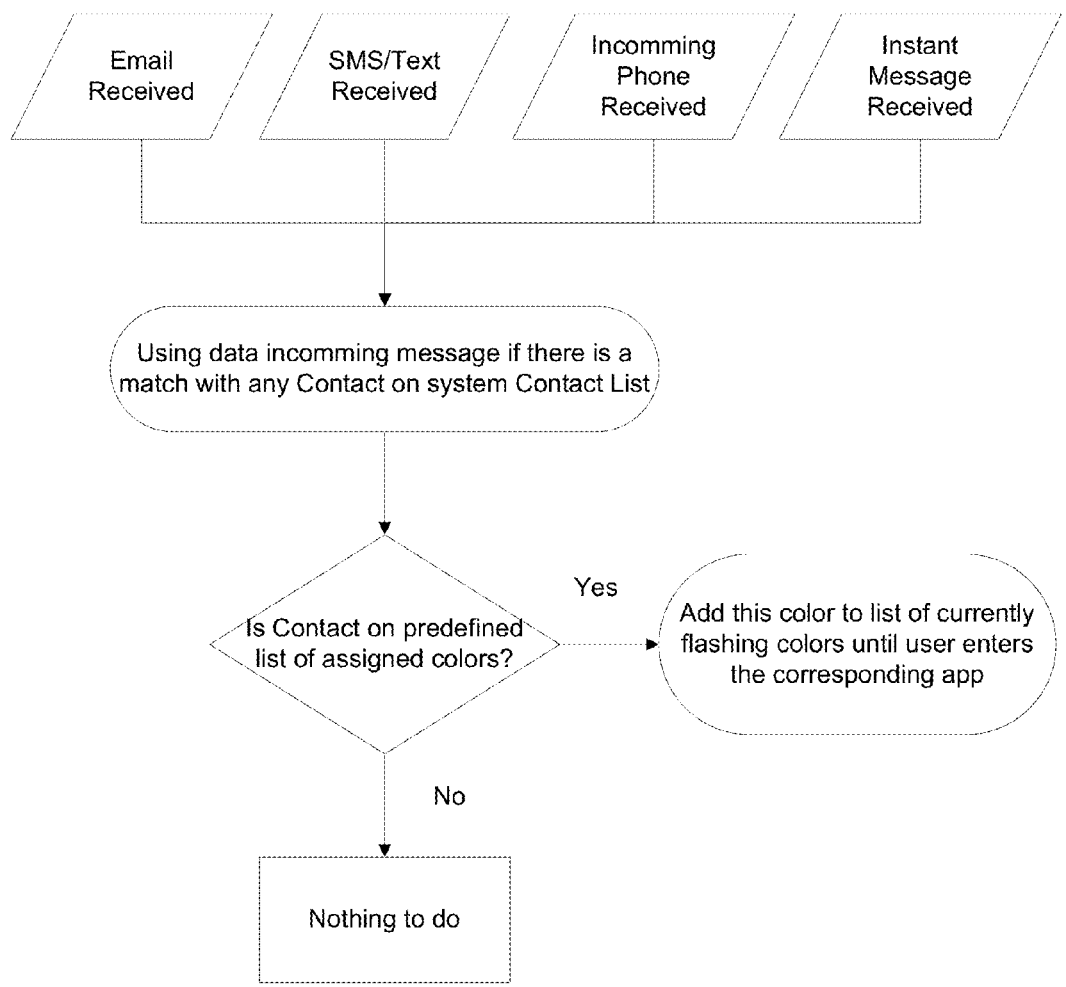
FIG. 2 shows a flow chart showing how different communications modalities can be assigned to the same contact group and color code.

Returning to the details of how the invention's method functions, when the App software is downloaded by the user and run on the target Smartphone, the App will generally prompt the user to determine at least some information pertaining to the telephone numbers, email addresses, social network postings, or SMS addresses of one or more potential callers. The software App will then prompt the user to assign these telephone numbers, email addresses, social network postings (e.g. Facebook, Twitter) or SMS addresses, on a per caller basis, to a contact group associated with this particular caller (here called the "individual"). This contact group based color assignment process is shown in FIG. 2.

Figure 3:
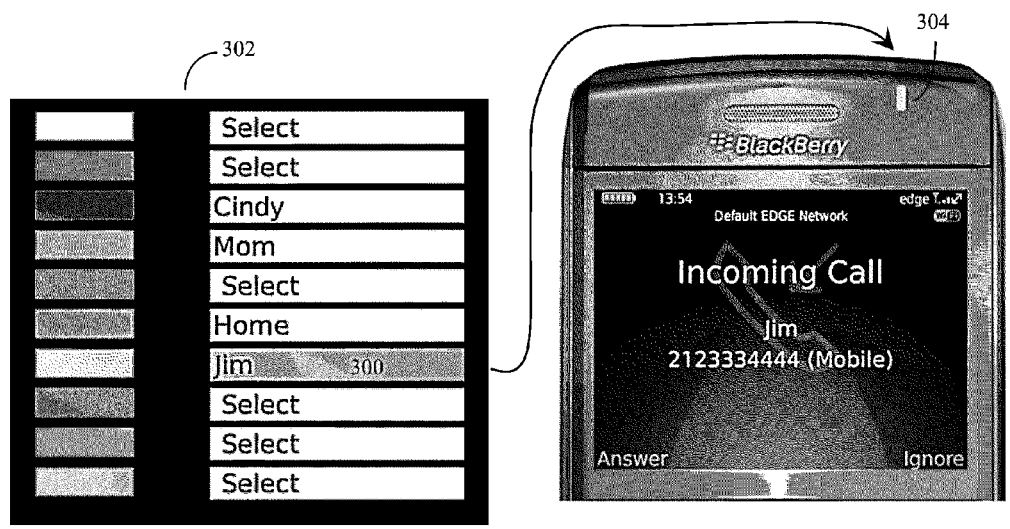
FIG. 3 shows a specific example of how different incoming callers can be assigned to different color output schemes, such as color LED output schemes.

The App will then prompt the user to use the Smartphone's graphical user interface (GUI) (e.g. display screen) to assign at least one colored light on the colored light emitting device (e.g. the display screen itself (108), or an optional colored LED mounted on the Smartphone (110)) to the contact group associated with the individual (incoming caller). The net effect will be to produce a contact group colored light emitting device color assignment. An example of such an assignment is shown in FIG. 3.

Here for example, the incoming caller named "Jim" (300) has been assigned a color that originally (before the figure was converted to black and white for patent purposes) was yellow. These color assignments (302) will be saved in the Smartphone's memory (104).

Then, when an assigned caller, such as "Jim" calls, sends an email, SMS message, or posts on a social network site monitored by the App (i.e. the App can be instructed to scan Jim's Facebook site, Twitter Site, etc. detect posts by Jim, and inform the user as desired) the Smartphone will detect this and flash the colored light emitting device according to the contact group colored light emitting device color assignment. In other words, if Jim is assigned the color "yellow", and if the colored light emitting device is a colored LED (110), then whenever Jim calls, texts, sends an SMS message, etc. to the user's Smartphone, the App can instruct the user's Smartphone to, for example turn on a yellow LED light (110), (304).

Various color assignments may be used. Often one steady color may be used for a particular caller or individual, but this need not be the case. In some embodiments, the colored light emitting device (e.g. colored LED) may be instructed to show two colors, either simultaneously, or consecutively (e.g. by first flashing one color, and then flashing a different color).

Figure 4:
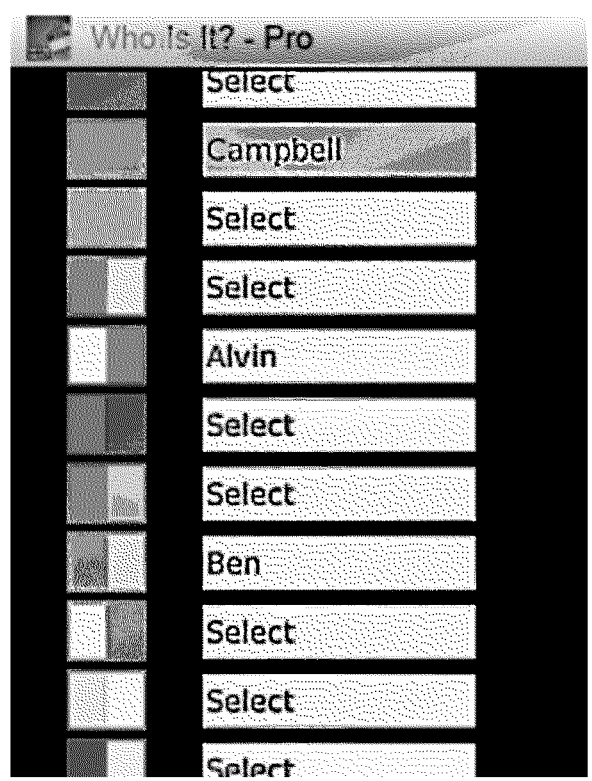
FIG. 4 shows an example of a two-color contact group color assignment scheme.

An example of such a two color assignment scheme is shown in FIG. 4.

The process of assigning incoming callers (individual's) various telephone numbers, email addresses, social network postings, or SMS addresses to a contact group associated with the individual can be done by various methods.

In one embodiment, the process of linking these various pieces of data to a contact group associated with an individual may be done by an outside messaging server, such as for example a Blackberry messenger server. Here, for example, the outside messaging server may expose the contact group to the Smartphone by way of an outside messaging server API (such as the Blackberry messaging server API). Thus here, the process of determining that a contact group is associated with a particular individual can be done by directing the Smartphone to use the outside messaging server API to query the outside messaging server for this contact group.

Here the general criteria is that in a preferred embodiment, the messaging server will maintain contact group information, and is also capable of exposing the contact group associated with a particular individual, either using one or more cross-platform messaging server API (which in turn may query various specific messaging servers), or by other methods.

Other outside messaging servers, as well as various cross-platform messaging applications (exemplified by the popular WhatsApp series of mobile apps, produced by WhatsApp Inc, Mountain View, Calif.) may also be used. Cross-platform messaging applications such as WhatsApp can act to aggregate message information obtained from multiple mobile platforms (e.g. Apple iOS, Android, Blackberry, Nokia, Symbian, Windows Phone, and the like). For example, such cross-platform messaging applications can supplant more expensive SMS messages (often subject to additional mobile phone charges) with an essentially free SMS alternative. Additionally, messages from various cross-platform users can also be supplemented with additional information, such as chatting, sharing location information, user status, images and videos, and the like. Such systems often also scan the user's mobile device address book, at least upon initialization, and thus can also acquire contact group information as well, which if available may also be utilized by the present invention.

When using such cross-platform messaging systems, the invention may, in some embodiments, assign one or more colors to incoming messages derived from the cross-platform messaging systems that may be different from the colors assigned to incoming messages from other sources. Alternatively or additionally, of course different contacts from the cross-platform messaging system may also be assigned different colors as well.

In some embodiments, the invention/App may optionally also assign at least one color based on the incoming messaging service used by the caller or individual. Here for example, a user may instruct a family member to use one messaging service for less critical messages, and a different critical messaging service for more critical messages. This way, an incoming message from a wife to a husband, for example, may be assigned a "red" light for important messages being sent by a particular messaging service reserved, by that caller or individual, for that more important purpose, and a "green" light for less important messages being sent by that caller or individual by a particular messaging service reserved for a less important purpose.

Alternatively or additionally, the process of linking an individual's telephone numbers, email addresses, social network links, or SMS addresses, and assigning these different data to a contact group associated with this individual can be done using the Smartphone's user interface. This can be used as the primary method of linking, or as a backup method to use to refine or reassign linkages previously assigned by an outside messaging server.

In other embodiments, the process of linking an individual's telephone numbers, email addresses, social network links, or SMS addresses, and assigning these different data to a contact group associated with this individual can be done by direct transmission of vCard information from the individual to the user. This also can be used as the primary method of linking, or as a backup method to use to refine or reassign linkages previously assigned by an outside messaging server.

Other options for defining a contact group and assigning colors include:

Option 1: The user can manually enter in the caller's (individual's) contact details into the system, such as the home phone, work phone, cell phone, other phone, email address, instant message ID, Twitter ID, Facebook ID, What's App ID, or an essentially unlimited number of other Social IDs.

Option 2: The user can select a record from the user's address book, which will generally already contain a majority of important attributes such as home phone, work phone, cell phone, other phone, email address, instant message ID, etc. In some cased, this contact record could also be used to identify the contact from other instant messaging apps as well.

In use, once the caller or individual contacts the Smartphone by some method, the Smartphone can, for example, continue to flash the colored light emitting device according to its previously specified color assignment until the user opens the phone or the list of callers on the phone (e.g. phone listing software) and determines the identity of the caller.

Alternatively, the app may instruct the Smartphone to flashing the phone's colored light emitting device phone's user contacts the caller.

As yet another alternative, the app may allow the user to use the Smartphone's user interface to establish a preset timeout interval. This preset timeout interval can then be used to flash the phone's colored light emitting device (108), (110) until this preset timeout interval has been exceeded. Thus for example, if the preset timeout interval is five minutes, the phone will flash for five minutes after the caller has called, and then stop.

In other embodiments, the invention may perform other functions, such as assigning different colors based on the type of incoming message service (e.g. yellow for Facebook, green for an SMS message, white for Twitter, and so on), assigning at least one color (for example blue) to missed calls, and the like.

The invention claimed is:

1. A method of visually signaling the identity of an individual contacting a Smartphone operated by a user, said Smartphone comprising a cellular phone transceiver, processor, software, memory, and at least one display comprising at least one multiple color light emitting diode or display screen, said display capable of emitting light in a first plurality of software controlled colors, said method comprising:

determining at least one of said individuals telephone numbers, email addresses, social network postings, incoming messaging service or Short Message Service (SMS) addresses, and assigning said telephone numbers, email addresses, social network postings address, incoming messaging service or SMS addresses into a contact group associated with said individual;

wherein the steps of determining at least one of said individuals telephone numbers, email addresses, social network postings address, incoming messaging service, or SMS addresses and assigning said telephone numbers, email addresses, social networks postings address, incoming messaging service or SMS addresses into a contact group associated with said individual is done by an outside messaging server;

wherein said outside messaging server exposes said contact group to said Smartphone by way of an outside messaging server Application Programming Interface (API); and wherein determining said contact group associated with said individual is done by directing said Smartphone to use said outside messaging server API to query said outside messaging server for said contact group;

using said graphical user interface to assign at least one display color to said contact group associated with said individual producing a contact group display color assignment;

saving said contact group display color assignment in said memory;

wherein for at least one of each incoming telephone call, email, social network posting, incoming messaging service, or SMS message from said contact group associated with said individual, then flashing at least a portion of said display according to said contact group display color assignment;

wherein said Smartphone further comprises phone listing software; and further flashing said at least a portion of said display according to said contact group display color assignment until said user opens said phone listing software and determines the identity of said individual.

2. The method of claim 1, wherein said at least one display color assigned to said contact group is two display colors;

and wherein for at least one of each incoming telephone call, email, social network posting, incoming messaging service or SMS message from said contact group associated with said individual, then alternatively flashing said at least a portion of said display according to said two display colors according to said contact group display color assignment.

3. The method of claim 1, further using said user interface to establish a preset timeout interval; and flashing said at least a portion of said display according to said contact group display color assignment until said preset timeout interval is exceeded.

4. The method of claim 1, wherein said outside messaging server exposes said contact group to said Smartphone by way of an outside messaging server API; and wherein determining said contact group associated with said individual is done by directing said Smartphone to use said outside messaging server API to query said outside messaging server for said contact group.

5. A method of visually signaling the identity of an individual contacting a Smartphone operated by a user, said Smartphone comprising a cellular phone transceiver, processor, software, memory, and at least one display comprising at least one multiple color light emitting diode or display screen, said display capable of emitting light in a first plurality of software controlled colors, said method comprising:

determining at least one of said individuals telephone numbers, email addresses, social network postings address, incoming messaging service, or Short Message Service (SMS) addresses, and assigning at least one of said telephone numbers, email addresses, social network postings address, incoming messaging service, or SMS addresses into a contact group associated with said individual;

wherein the steps of determining at least one of said individuals telephone numbers, email addresses, social network postings address, incoming messaging services or SMS addresses and assigning said telephone numbers, email addresses, social network postings address, incoming messaging services, or SMS addresses into a contact group associated with said individual is done by an outside messaging server;

wherein said outside messaging server exposes said contact group to said Smartphone by way of an outside messaging server Application Programming Interface (API); and wherein determining said contact group associated with said individual is done by directing said Smartphone to use said outside messaging server API to query said outside messaging server for said contact group;

wherein the steps of determining at least one of said individuals telephone numbers, email addresses, social network postings address, incoming message service, or SMS addresses and assigning at least one of said telephone numbers, email addresses, social network postings address, incoming message service or SMS addresses into a contact group associated with said individual is either further determined using said user interface; or wherein the steps of determining at least one of said individuals telephone numbers, email addresses, social network postings address, incoming message service or SMS addresses and assigning said telephone numbers, email addresses, social network postings address, incoming message service or SMS addresses into a contact group associated with said individual is further determined by direct transmission of vCard information from said individual to said user;

using said graphical user interface to assign at least one display color to said contact group associated with said individual producing a contact group display color assignment;

saving said contact group display color assignment in said memory; and wherein for said least one of each incoming telephone call, email, social network posting, incoming messaging service, or SMS message from said contact group associated with said individual, then flashing at least a portion of said display according to said contact group display color assignment.

6. The method of claim 5, wherein said at least one display color assigned to said contact group is two display colors;

and wherein for said least one of each incoming telephone call, email, social network posting, incoming messaging service, or SMS message from said contact group associated with said individual, then alternatively flashing said at least a portion of said display according to said two display colors according to said contact group display color assignment.

7. The method of claim 5, wherein said Smartphone further comprises phone listing software; and further flashing said at least a portion of said display according to said contact group display color assignment until said user opens said phone listing software and determines the identity of said individual.

8. The method of claim 5, further flashing said at least a portion of said display according to said contact group display color assignment until said user contacts said individual.

9. The method of claim 5, further using said user interface to establish a preset timeout interval; and flashing said at least a portion of said display according to said contact group display color assignment until said preset timeout interval is exceeded.

10. The method of claim 5, wherein said outside messaging server exposes said contact group to said Smartphone by way of an outside messaging server API; and wherein determining said contact group associated with said individual is done by directing said Smartphone to use said outside messaging server API to query said outside messaging server for said contact group.

11. The method of claim 1, wherein said display comprises a display screen, and at least a portion of said display screen is a colored bar or other icon on said display screen.

12. The method of claim 5, wherein said display comprises a display screen, and said at least a portion of said display screen is a colored bar or other icon on said display screen.

* * * * *